United States Patent [19]

Wilcox et al.

[11] Patent Number: 5,070,568
[45] Date of Patent: Dec. 10, 1991

[54] CLEANING DEVICE FOR CLEANING NOZZLE AND WELDING TIP OF A WIRE FEED ELECTRICAL ARC WELDER

[75] Inventors: Orville L. Wilcox, E. 7208 Boone Ave., Spokane, Wash. 99212; Ronald R. Reed, Newman, Wash.

[73] Assignee: Orville L. Wilcox, Spokane, Wash.

[21] Appl. No.: 488,624

[22] Filed: Mar. 5, 1990

[51] Int. Cl.⁵ .................. B08B 9/00; A47L 25/00; B23D 79/02
[52] U.S. Cl. .................. 15/93.1; 15/104.02; 15/104.04; 15/104.05
[58] Field of Search .................. 15/3, 3.53, 23, 88, 15/93.1, 104.02, 104.05, 104.16, 104.1 R, 104.04; 219/137.31; 408/1 R, 210

[56] References Cited

U.S. PATENT DOCUMENTS

| | | | |
|---|---|---|---|
| 2,296,801 | 9/1942 | Thomas | 15/88 X |
| 2,793,473 | 5/1957 | Hickman | 15/88 |
| 3,027,688 | 4/1962 | Zabransky | 15/88 |
| 3,284,833 | 11/1966 | von Tersch et al. | 15/104.02 |
| 3,492,684 | 3/1970 | Altermare | 15/180 |
| 3,689,732 | 9/1972 | Hill | 219/137.31 |
| 4,426,749 | 1/1984 | Long | 15/93.1 |
| 4,583,257 | 4/1986 | Bridges et al. | 15/93 R |
| 4,702,195 | 10/1987 | Thielmann | 118/72 |
| 4,731,518 | 3/1988 | Parmell et al. | 219/137.31 |
| 4,916,270 | 4/1990 | West et al. | 219/137.31 |
| 4,954,690 | 9/1990 | Kensrue | 219/137.31 |

FOREIGN PATENT DOCUMENTS 0343434 11/1989 PCT Int'l Appl. ............... 15/104.05

*Primary Examiner*—William A. Cuchlinski, Jr.
*Assistant Examiner*—James K. Folker
*Attorney, Agent, or Firm*—Wells, St. John & Roberts

[57] ABSTRACT

A preferred embodiment of the subject electrical arc-welding gun cleaning tool for removing welding splatter from the welding tip and nozzle of a wire-feed arc-welding gun is described. The tool comprises a cleaning tool base 52 connected to a drive means 90 for rotating the base 52 in a desired direction about a drive axis. A conical spiral spring 64 is attached to the base 52 for insertion into the arc-welding gun nozzle 33. The rotating spring 64 surrounds the welding tip 40 and expands to also contact the inner surface of the inner surface 36 of the arc-welding gun nozzle 33. The spring 64 removes accumulated welding splatter as it rotates. A cylindrical tube 82, with serrations 86 at a receiving end 84, limits penetration of the spring 64 into the arc-welding gun nozzle 33 while also removing welding splatter from the outer end 43 of the welding tip 40.

14 Claims, 4 Drawing Sheets

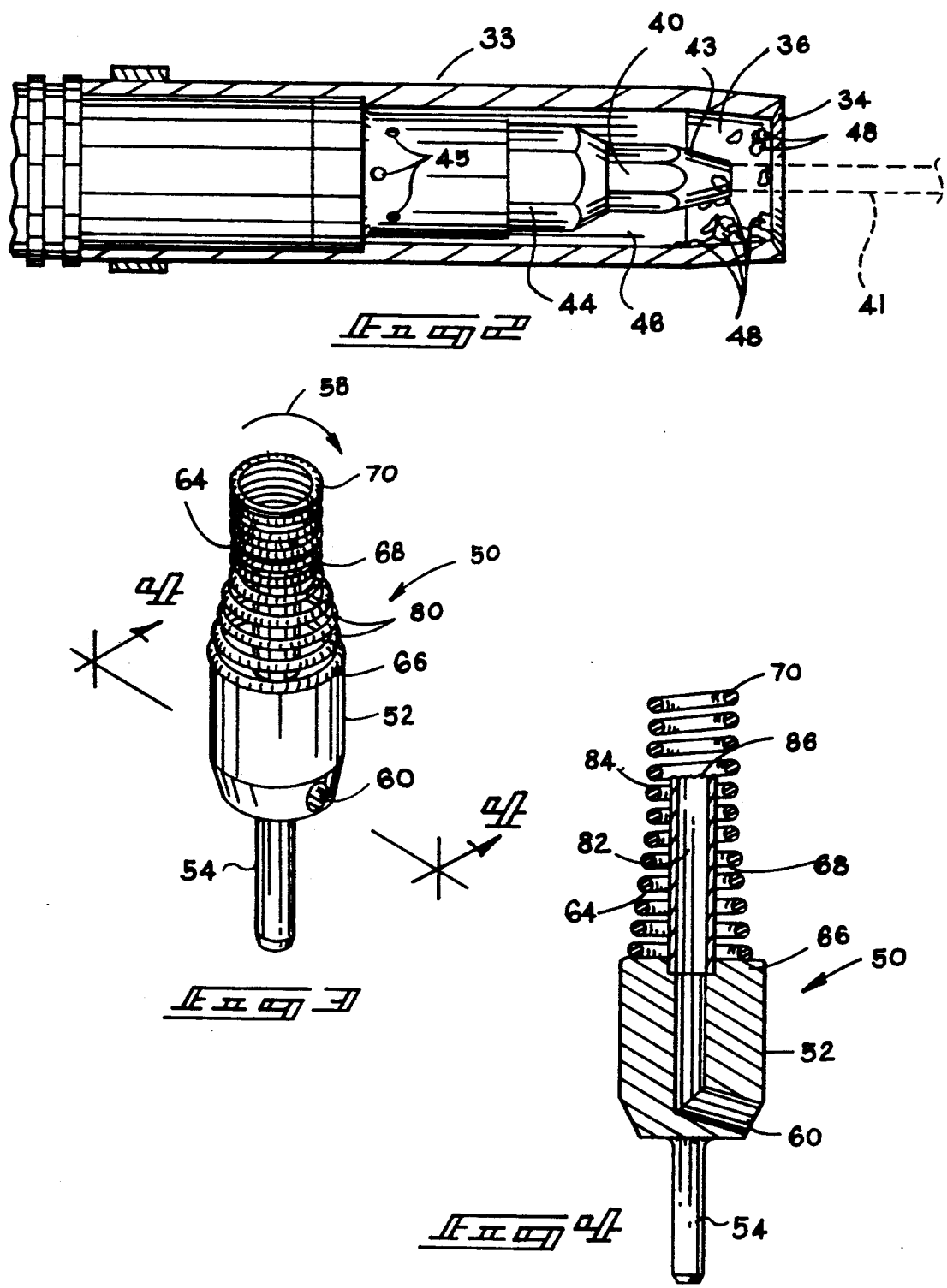

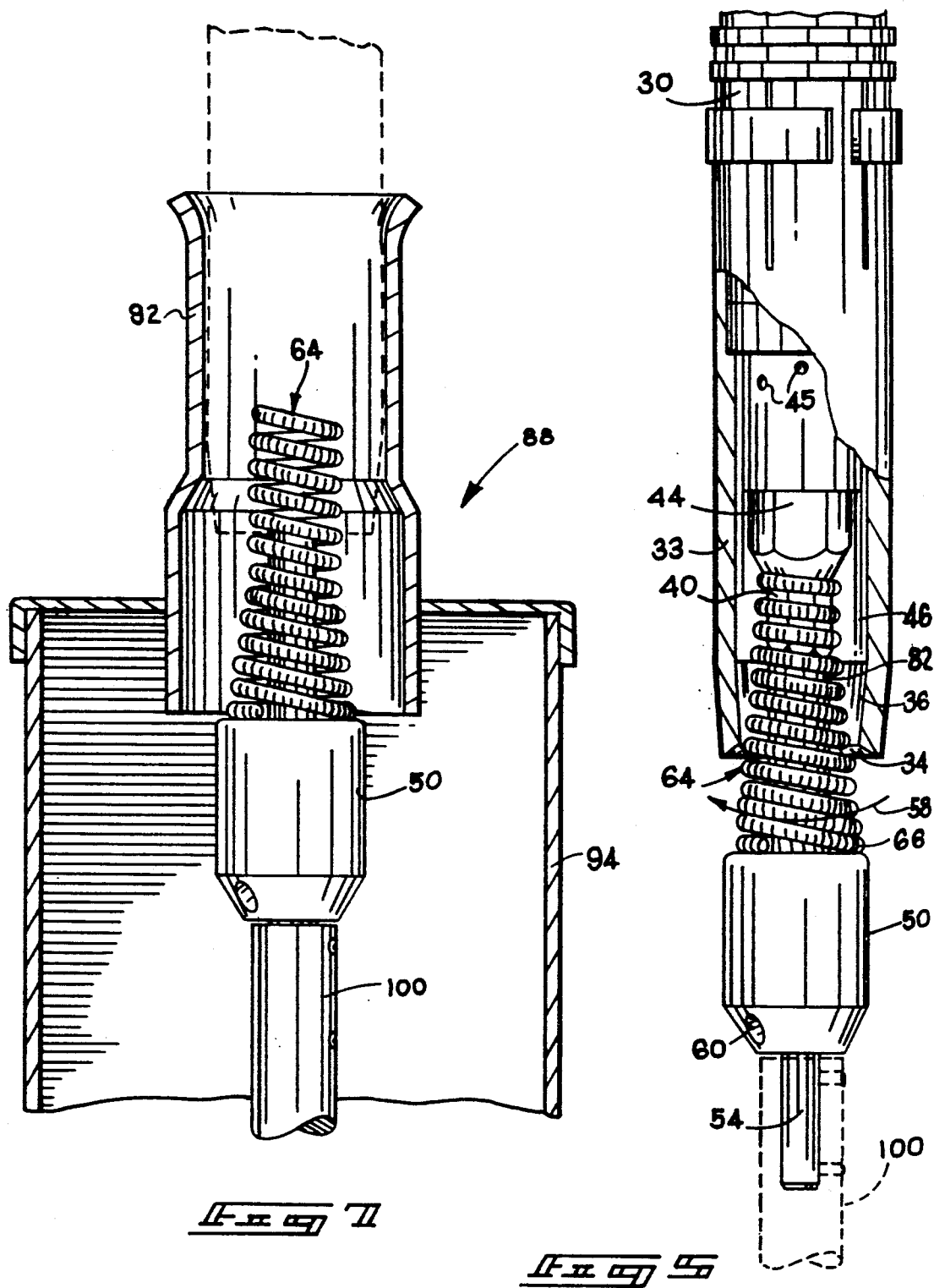

CLEANING DEVICE FOR CLEANING NOZZLE AND WELDING TIP OF A WIRE FEED ELECTRICAL ARC WELDER

TECHNICAL FIELD

This invention relates to wire feed, electrical arc-welding guns and more particularly to arc-welding gun cleaning tools for periodically cleaning welding splatter from the gun.

BACKGROUND OF THE INVENTION

An electrical wire-feed arc-welding system utilizes an arc-welding gun which an operator or robot grasps to direct a welding arc onto a workpiece. Welding rod is fed through the gun to a welding tip which is surrounded by an open cylindrical nozzle. An inert gas such as argon is directed through the nozzle, around the welding tip, and over the welding surface of the workpiece to provide a suitable inert atmosphere to exclude oxygen from the weld being formed by the electric arc and weld wire.

As welding progresses, weld wire particles are thrown from the arc and accumulate on the welding tip and the surrounding nozzle. The particles, referred to as welding splatter, tend, to, over time, block the proper flow of inert gas through the gas cavity, and eventually adversely affect the quality of the weld. Spray or paste-like anti-adhesive compounds are often applied to the welding tip and nozzle to prevent this buildup; however, these compounds are usually not completely effective, tending only to reduce the amount and rate of buildup rather than to completely eliminate it. Thus, even when using anti-adhesive compound, accumulated welding splatter must be periodically cleaned from the arc-welding gun.

To overcome this problem, operators have devised various ways to remove welding splatter from the welding gun. One simple method is to scrape the surfaces with the end of a screwdriver or similar tool. Unfortunately, this method is awkward and inefficient-more seriously, it can easily damage the welding gun.

Rotating cutter blades have also been used to remove welding splatter. The blades extend into the nozzle to scrape welding splatter from the surfaces of the welding tip and nozzle. See the Bridges et al. U.S. Pat. No. 4,583,257 and the Thielmann U.S. Pat. No. 4,702,195. Unfortunately, very precise positioning of the gun relative to the rotating blades is required, making hand operation, as well as operation with some robots, somewhat impractical or impossible. Any misalignment during cleaning can destroy the welding tip and nozzle.

The applicant has sought to improve the operation of arc-welding gun cleaning tools and has invented such a tool which is more efficient and versatile than previous cleaning tools. In addition, the applicant has provided an arc-welding gun cleaning tool which can be inexpensively manufactured and which can be conveniently used in both hand and robot operations.

BRIEF DESCRIPTION OF THE DRAWINGS

The preferred embodiment of the invention is illustrated in the accompanying drawings, in which:

FIG. 2 is a vertical cross-sectional view taken along line 2—2 in FIG. 1 illustrating a welding tip nozzle surrounding the welding tip;

FIG. 3 is an isometric view of a preferred embodiment of the arc-welding gun cleaning tool;

FIG. 4 is a vertical cross-sectional view taken along line 4—4 in FIG. 3 illustrating in more detail the arc-welding gun cleaning tool shown in FIG. 3.

FIG. 5 is a cross sectional view of a nozzle, showing the arc-welding gun cleaning tool shown in FIGS. 3 and 4 being inserted into the nozzle;

FIG. 7 is a cross-sectional view of the arc-welding gun cleaning device of FIG. 6.

DETAILED DESCRIPTION OF THE PREFERRED EMBODIMENTS

The following disclosure of the invention is submitted in furtherance with the constitutional purpose of the Patent Laws "to promote the progress of science and useful arts" (Article 1, Section 8).

Figure 1:
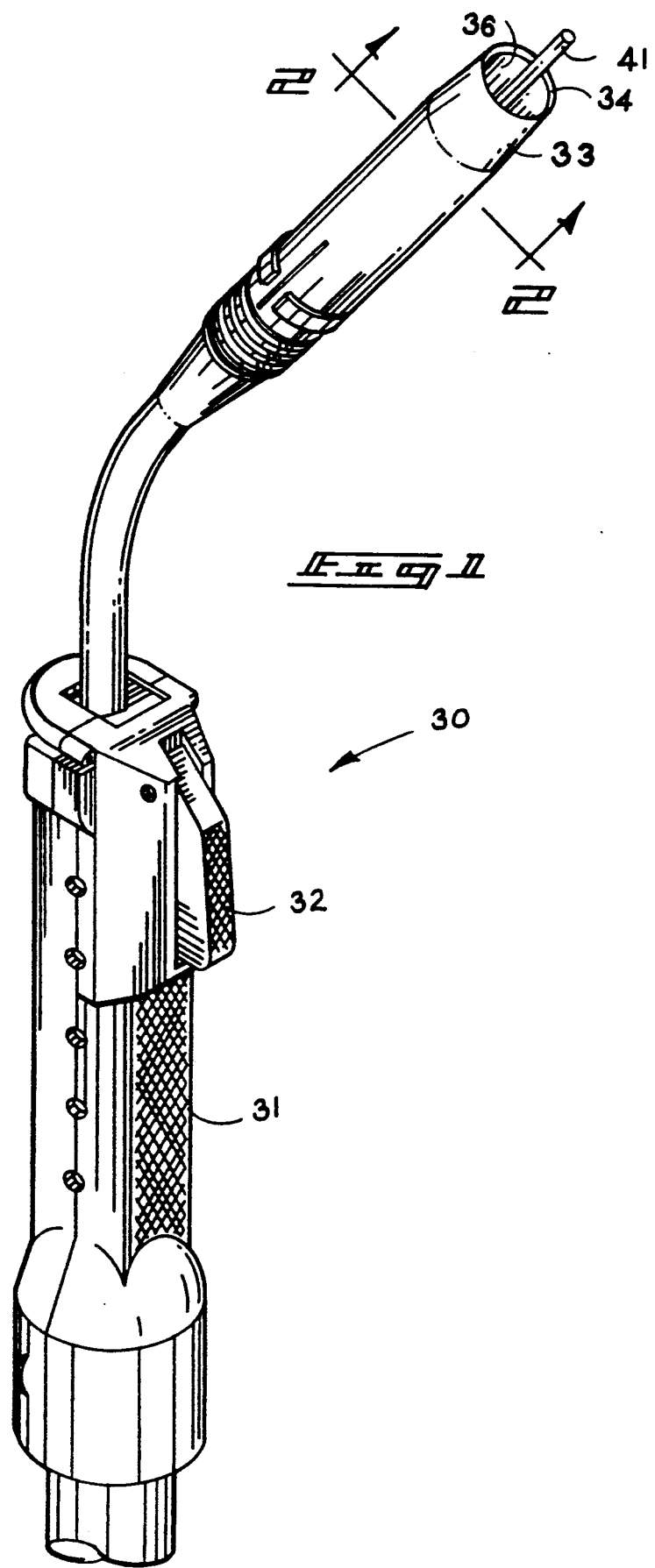
FIG. 1 is an isometric view of a hand-held wire-feed welding gun.

A preferred embodiment of the arc-welding gun cleaning tool is illustrated in FIGS. 3 and 4 and is generally identified with the numeral 50. The tool 50 is designed to efficiently remove accumulated welding splatter from a wire feed electrical arc-welding gun 30 illustrated in FIGS. 1 and 2.

The electrical arc-welding gun 30 is connected to a weld wire feeder for automatically feeding welding rod wire material to the electrical arc as the operator is welding a work piece. The gun 30 may be held manually or it may be attached to a robot for automated welding. In this description, a manually held gun 30 is shown. The operator grasps the gun 30 by a handle 31. The gun 30 includes a cylindrical nozzle 33 surrounding an electrical arc welding tip 40. The tip 40 has an internal base through which wire-feed welding rod 41 is advanced when the operator presses a trigger 32.

The welding tip 40 is an elongated, generally cylindrical, tube which extends outward from a welding tip base 44. The base 44 has a larger diameter than that of the welding tip 40 itself. The welding tip 40 also has a beveled outer end 43 from which the welding rod 41 emerges. The welding tip 40 is electrically connected to the arc circuit for generating an electrical arc between the tip 40 and the workpiece.

Gas vents 45, in the welding tip base 44, discharge an inert gas such as argon during operation for removing oxygen from the weld situs. A cylindrical nozzle 33, with an open end 34, surrounds the welding tip 40 and base 44, forming an annular inert gas cavity 46 between its inner diameter and the outer diameter of the welding tip 40. The inert gas is thus guided through the gas cavity 46, through the open end 34 of the cylindrical nozzle 33, and over the welding surface to provide a suitable inert atmosphere for weld formation.

During operation, the open end 34 of the nozzle 33 is placed very near the welding surface. As welding progresses, molten weld material tends to splatter and accumulate within the cylindrical nozzle 33. Such molten material, referred to as welding splatter 48, adheres to both the outer surface of the welding tip 40, the open end 34 and the inner surface 36 of the cylindrical nozzle. The accumulated welding splatter 48 eventually restricts and/or misdirects the gas flow through the gas cavity 46 and must be removed.

FIGS. 3 and 4 show a preferred embodiment of the arc-welding gun cleaning tool 50 of this invention. A cleaning tool base 52, longitudinally centered around a central rotational drive axis, has a drive shaft 54 for coupling to a suitable rotary drive to rotate the base 52 in a single desired direction 58.

A conical spiral spring 64, coaxial with the drive axis, is affixed to the cleaning tool base 52 at an enlarged base end 66 of the spring 64. A conical cleaning section 68 extends freely in an open coil from the enlarged base end 66 to a reduced terminal end 70. The spring 64 has inner and outer diameters which decrease from the base end 66 to the terminal end 70. Preferably, the outer diameter of the spring 64 at the base end 66 is greater than the internal diameter of the nozzle 33. Preferably, the inner diameter at the terminal end 70 is slightly greater than the outer diameter of the welding tip 40 but less than the internal diameter of the nozzle so that the terminal end 70 will pass over the welding tip 40 as the tool 50 is inserted into the nozzle 33 shown in FIG. 5.

The spring 64 is preferably wound from spring steel wire of about 1/16th of an inch diameter, with serrations 80 being placed on the outer periphery of at least the cleaning section 68 to engage and dislodge adjacent welding splatter 48.

Preferably, the conical cleaning section 68 has a length and taper sufficient to extend fully into the nozzle 33 with the terminal end 70 engaging the base portion 44 of the welding tip 40. Further movement of the cleaning section 68 into the nozzle 33 causes the cleaning section 68 to compress, with coils engaging the inner surface 36 and the open end 34 of the nozzle 33 to remove welding splatter from such nozzle surfaces.

In addition, to extend contact between the cleaning section 68 and the inner surface 36, the spiral spring 64 is wound, from the base end 66 to the terminal end 70, in the same direction as the desired direction of rotation 58. Thus, any interference by the spring 64 with the welding tip 40, welding tip base 44, nozzle 33, or the welding splatter 48 will tend to expand the diameter of the spring 64, bringing it into further and more forceful contact with the inner surface 36 of the nozzle 33. This expansion also prevents the spring from becoming bound to the welding tip 40.

In operation, the cleaning tool base 52 is rotated in the desired direction 58. While rotating, the spring 64 is inserted into the gun nozzle 33 and around the welding tip 40 until the terminal end 70 contacts the welding tip base 44 as shown in FIG. 5. Welding splatter 48 is removed from the welding tip 40 as the terminal end 70 of the rotating conical spiral spring 64 moves over it.

To limit the extent of spring compression, a cylindrical tube 82 is affixed to the cleaning tool base 52 coaxially within the conical spiral spring 64. The tube 82 has a receiving end for receiving the outer end 43 of the welding tip 40 and for limiting movement of the cleaning tool 50 towards the welding tip 40.

The receiving end 84 has serrations 86 which enhance removal of welding splatter 48 from the outer end 43 of the welding tip 40. The welding splatter which is thus dislodged falls down the tube 82. A drain passage 60 in the cleaning tool base communicates with the cylindrical tube 82 and allows passage of the dislodged welding splatter to the exterior of the cleaning tool 50.

Figure 6:
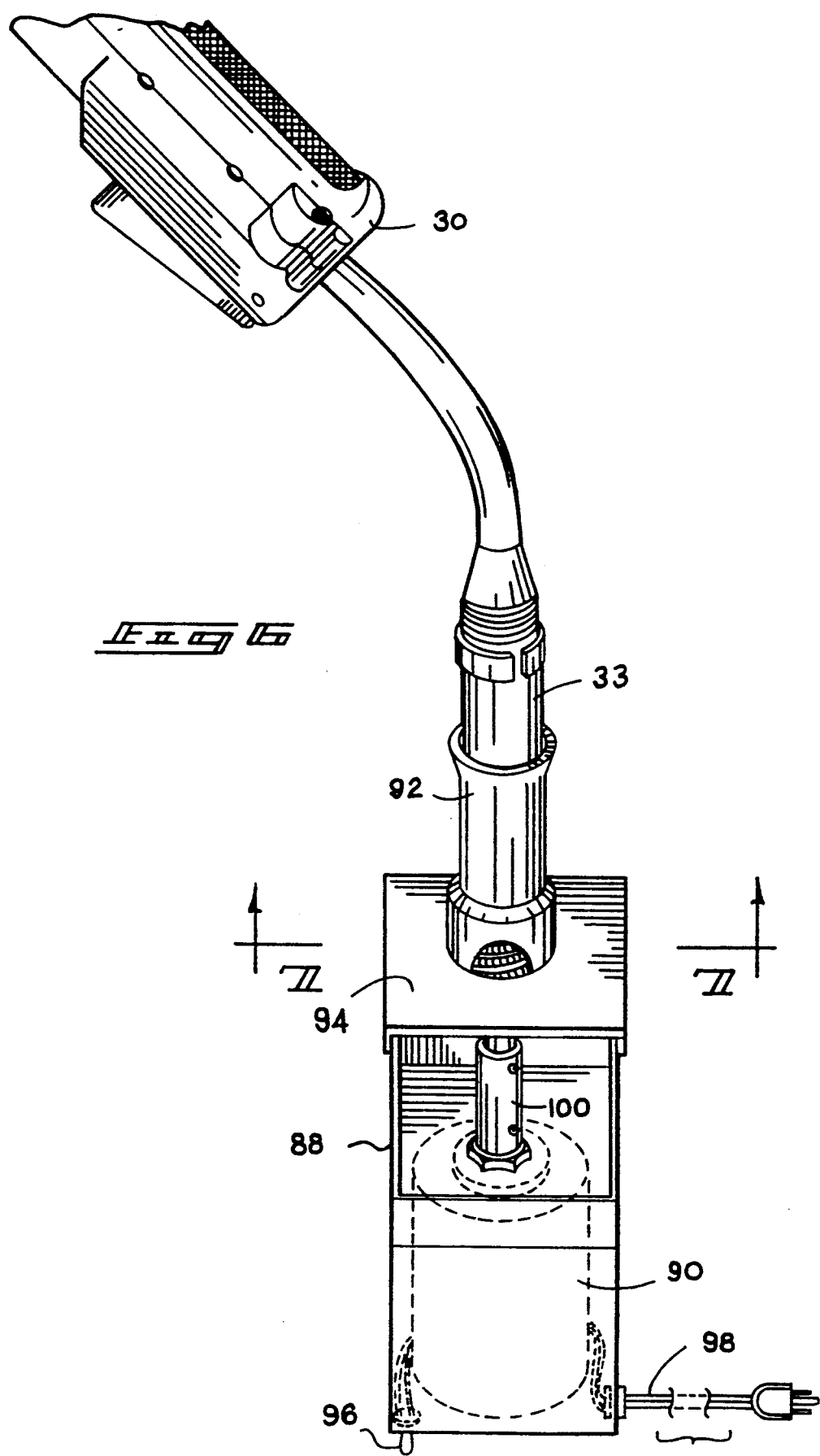
FIG. 6 is an isometric view of a preferred embodiment of the arc-welding gun cleaning device that incorporates the tool shown in FIGS. 3 and 4.

The cleaning tool 50 described above is best utilized in combination with the device 88 shown in FIGS. 6 and 7. The device 88 has housing 94 containing a drive means 90, such as an electrical motor. The cleaning tool 50 is attached to a drive shaft for rotating the cleaning tool 50 in the desired direction 58 about the drive axis. An electrical cord 98 extends from the housing to connect the drive means 90 to an electrical source. A hand-operated electrical switch 96 is used for turning the drive means 90 on and off.

The cleaning tool 50 is attached to the drive means 90 with a suitable rigid coupling 100, and preferably extends upwardly from the drive means 90. A cylindrical stationary sleeve 92, coaxial with the drive axis, surrounds the cleaning tool 50. The inner diameter of the sleeve 92 is complementary to the outer diameter of the cylindrical nozzle 33 so that the nozzle 33 may be easily inserted into the sleeve 92.

To clean the arc-welding gun 30, the nozzle 33 is simply inserted into the sleeve 92 until the outer end 43 of the welding tip 40 is received by the receiving end 84 of the cylindrical tube 82. The sleeve conveniently aligns the nozzle 33 with the cleaning tool 50 while the cylindrical tube 82 limits the degree of insertion. The rotating conical spiral spring 64 dislodges welding splatter 48 from the welding tip 40 as the terminal end 70 moves over the welding tip 40 and from the inner surface 36 of the nozzle 33 as the spring 64 compresses and expands to forcefully contact the nozzle 33. Dislodged welding splatter 48 falls either down the cylindrical tube 82 and through the drain passage 60, or around the spring 64 where it eventually falls into the housing.

While a hand-operated electrical switch 96 is shown for turning the drive means 90 on and off, a switch could alternatively be placed to automatically start the drive means 90 when the nozzle 33 is placed within the stationary sleeve 92.

The arc-welding gun cleaning tool 50 and devices 88 thus provide an efficient and convenient way to remove welding splatter from arc-welding guns for use in both hand and robot operations. In addition, the invention is simple and, therefore, inexpensively manufactured.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. An electrical arc-welding gun cleaning tool mountable to a drive for rotating the tool in a desired direction about a drive axis to remove welding splatter from a wire-feed arc-welding gun, in which the gun has (1) a cylindrical nozzle with an open end and an inner surface of known inner diameter, (2) an inner coaxial welding tip having a known outer diameter, and (3) an inert gas cavity intermediate the nozzle and the welding tip, the tool comprising:
   a cleaning tool base mountable to the drive for rotation in the desired direction about the drive axis;
   a conical spiral spring having an enlarged base end affixed to the cleaning tool base and a conical cleaning section extending freely outward from the base end to a reduced terminal end substantially coaxial with the drive axis when the cleaning tool base is mounted to the drive; and
   wherein the conical spiral spring has inner and outer diameters which progressively decrease from the base end to the terminal end in which (1) the outer diameter of the spring at the base is greater than the inner diameter of the cylindrical nozzle of the gun, (2) the outer diameter of the spring at the terminal end is less than the inner diameter of the cylindrical nozzle and (3) the inner diameter of the spring at the terminal end substantially corresponds to the outer diameter of the welding tip to permit the insertion of the terminal end of the spring into the gas cavity with the cleaning section engaging the cylindrical nozzle and the terminal end receiving the welding tip to simultaneously remove the welding splatter from both the cylindrical nozzle and the welding tip as the cleaning tool is rotated about the drive axis.

2. The electrical arc-welding gun cleaning tool of claim 1, wherein the conical spiral spring is spirally wound from the base end to the terminal end in the same angular direction as the desired direction of rotation to facilitate radial expansion of the conical spiral spring during rotation as it engages the cylindrical nozzle and receives the welding tip and to facilitate removal of the cleaning section and the terminal end from the gas cavity once the welding splatter is removed.

3. The electrical arc-welding gun cleaning tool of claim 2, wherein the arc-welding gun has a welding tip base within the base cavity and the welding tip extends from the welding tip base toward the open end of the cylindrical nozzle, and wherein the terminal end of the conical spiral spring receives the welding tip and engages the welding tip base for longitudinally compressing and radially expanding the conical spiral spring, thus facilitating engagement of the cleaning section with the inner surface of the nozzle.

4. The electrical arc-welding gun cleaning tool of claim 1, wherein the coil spring is formed of a wire having peripheral serration.

5. The electrical arc-welding gun cleaning tool of claim 1, wherein the cleaning tool base has a drain passage formed therein extending from within the inner diameter of the base end of the conical spiral spring to an exterior of the cleaning tool base to permit removed welding splatter to pass through the drain passage.

6. The electrical arc-welding gun cleaning tool of claim 1, further comprising a cylindrical tube, the tube being attached to the rotational base within the coil spring coaxially with the drive axis for receiving the inner tip at a receiving end of the cylindrical tube and for limiting inward penetration of the coil spring into the gas cavity.

7. The electrical arc-welding gun cleaning tool of claim 6, wherein the receiving end of the cylindrical tube is serrated for assisting in removing welding splatter from the inner tip.

8. The electrical arc-welding gun cleaning tool of claim 6 wherein the cleaning base has a drain passage communicating with the cylindrical tube to provide drainage of removed welding splatter from within the cylindrical tube.

9. The electrical arc-welding gun cleaning tool of claim 6 wherein the arc-welding gun has a welding tip base within the gas cavity and the welding tip extends from the welding tip base toward the open end of the cylindrical nozzle, and wherein the terminal end of the conical spiral spring extends beyond the receiving end of the cylindrical tube, receiving the welding tip and engaging the welding tip base, and the conical spiral spring is longitudinally compressed and radially expanded as it engages the welding tip base for facilitating engagement of the cleaning section with the inner surface of the nozzle.

10. An electrical arc-welding gun cleaning machine for removing welding splatter from a cylindrical nozzle and welding tip of an electrical wire-feed arc-welding gun, in which the welding tip has a presented outer diameter and is mounted coaxially within the cylindrical nozzle and surrounded by an annular inert gas cavity, the machine comprising:
a cleaning tool base for rotation in a prescribed annular direction about a central rotation axis;
a drive means for rotating the cleaning tool base in the prescribed annular direction;
a conical spiral spring having an enlarged base end affixed to the cleaning tool base and a conical cleaning section extending freely outward from the base end to a reduced terminal end substantially coaxial with the central rotational axis; and
a stationary sleeve surrounding the coil spring and coaxial with the central rotational axis to receive and guide the nozzle and welding tip therein and into cleaning engagement with the conical spiral spring to remove the welding splatter from the nozzle and welding tip as the conical spiral cleaning spring is rotated.

11. The electrical arc-welding gun cleaning machine of claim 10, wherein the coil spring has inner and outer diameters which decrease toward the terminal end and the inner diameter of the conical spiral spring at its terminal end is larger than the outer diameter of the welding tip.

12. The electrical arc-welding gun cleaning machine of claim 10, further comprising a cylindrical tube attached to the cleaning tool base within the conical spiral spring coaxially with the central rotational axis for receiving the welding tip at a receiving end of the cylindrical tube and for limiting inward penetration of the conical spiral spring into the gas cavity.

13. The electrical wire-feed arc-welding gun cleaning machine of claim 12, wherein the receiving end of the cylindrical tube is serrated for assisting in removing welding splatter from the welding tip.

14. The electrical arc-welding gun cleaning machine of claim 12 wherein:
the cylindrical tube has an inner cylindrical passage along its length; and
the rotational base has a drain passage communicating with the cylindrical tube to provide drainage of removed welding splatter from within the cylindrical tube.

* * * * *